United States Patent [19]
Brown

[11] 3,840,845
[45] Oct. 8, 1974

[54] METHOD OF INITIATING AND COLLECTING SEISMIC DATA RELATED TO STRATA UNDERLYING BODIES OF WATER USING A CONTINUOUSLY MOVING SEISMIC EXPLORATION SYSTEM LOCATED ON A SINGLE BOAT USING SEPARATE STREAMERS

[75] Inventor: Robert J. S. Brown, Fullerton, Calif.

[73] Assignee: Chevron Research Company, San Francisco, Calif.

[22] Filed: June 29, 1973

[21] Appl. No.: 375,303

[52] U.S. Cl. .......................... 340/7 R, 340/15.5 MC
[51] Int. Cl. .......................... G01v 1/28, G01v 1/38
[58] Field of Search...... 340/7 R, 15.5 CP, 15.5 MC

[56] References Cited
UNITED STATES PATENTS
3,525,072  8/1970  Born et al. ......................... 340/7 R
3,581,273  5/1971  Nedberg ........................... 340/7 PC

*Primary Examiner*—Maynard R. Wilbur
*Assistant Examiner*—N. Moskowitz
*Attorney, Agent, or Firm*—J. A. Buchanan, Jr.; Ralph L. Freeland, Jr.; H. D. Messner

[57] ABSTRACT

Description is hereinafter had to a method for collecting seismic data related to two-dimensional subsurface coverage of strata underlying a body of water. In accordance with the present invention, a continuously moving marine seismic exploration system includes a repetitive seismic source and two separate streamers of hydrophones trailing behind a single seismic boat traversing the body of water along a straight base course line. The seismic source is fired at a selected repetition rate to generate a series of firing stations coincident with the base course line. The streamers include pluralities of hydrophones connected to the seismic boat by means of a bridle assembly extending from the rear of the boat; the bridle locates each streamer at different depths; each streamer terminates in a paravane assembly connected to its trailing end. In operation, the paravane of a first streamer has a rudder assembly whose position is arranged, as by radio commands from the seismic boat or under mechanically induced programmed commands, to maintain the trailing end of the first streamer along a straight line parallel to the base line and offset from it by a selected but substantially constant distance much greater than that for the leading end of the streamer. Thus, because of forces acting thereon, the first streamer assumes the shape of a modified catenary. On the other hand, the second streamer is arranged to trail behind the boat along a vertical plane substantially coincident with the base course line. The outer boundary of points is equal to one-half the offset distance of the trailing end of the first streamer from the base course line. Since the seismic boat proceeds along the base course line at a constant speed, a grid of depth points including a series of in-line seismic points are obtained. When sets of traces associated with the offset and in-line seismic depth points are processed, the contribution of the normal and cross movement of each trace can be easily determined since the in-line traces are devoid of cross dip movement contributions. In order for the swathe of source-receiver positions at the surface to be clearly identified with the series of center point arrays, the streamers can also be provided with a series of sonic transducers along this length. Sonic pulses are emitted from a transmitter aboard the boat (preferably after seismic source is activated, but before the reflections are received at the hydrophones) and are subsequently detected by the streamer transducers and retransferred back to the boat. In that way, identifying the instantaneous locations of the transducers by means of digital ranging techniques can be achieved. In one form of the invention, the binary indications of the travel time of the sonic wave, and hence the instantaneous positions of the transducers per each shot, are directly encoded onto the field magnetic tape for later use in mapping of the subsurface under survey.

7 Claims, 8 Drawing Figures

METHOD OF INITIATING AND COLLECTING SEISMIC DATA RELATED TO STRATA UNDERLYING BODIES OF WATER USING A CONTINUOUSLY MOVING SEISMIC EXPLORATION SYSTEM LOCATED ON A SINGLE BOAT USING SEPARATE STREAMERS

FIELD OF THE INVENTION

This invention relates to marine seismic exploration and more particularly to a method of collecting, processing and displaying areal marine seismic data using a continuously moving marine exploration system aboard a single seismic boat. In one aspect of the present invention, seismic data is associated with a two-dimensional array of center points provided by keeping the trailing end of a first marine streamer along a straight course line parallel but offset to the base course line at a much greater offset distance than the leading edge of the streamer, while simultaneously providing in-line data from hydrophones constituting a second streamer aligned in a vertical plane through the base course line. In another aspect, the relative positions of hydrophones of the streamers relative to the boat during each shooting and collection period are accurately established using a digital sonic ranging technique in which sonic pulses from a transmitter aboard the boat are detected by a series of transducers along the streamers, and retransmitted back to the boat for recording onto a magnetic tape in a digital format compatible with a special purpose or a programmed general purpose digital computer.

BACKGROUND OF THE INVENTION

In the art of seismic exploration, the desirability of increasing signal-to-noise ratio of marine seismic data is well known. Successful techniques of producing a series of locational seismic traces associated with cross sets of center points are described in copending applications of Aubra E. Tilley, R. J. S. Brown and Roger D. Judson for "Method of Collecting Seismic Data of Strata Underlying Bodies of Water," Ser. No. 366,384 filed June 4, 1973, now U.S. Pat. No. 3,806,863, and Hilmi F. Sagoci for "Method of Initiating and Collecting Seismic Data Related to Strata Underlying Bodies of Water Using a Continuously Moving Seismic Exploration System Located on a Single Boat," Ser. No. 366,382, filed June 4, 1973.

In the first mentioned application, locational traces related to a constant grid of two-dimensional center points are obtained utilizing a plurality of shooting boats in which seismic sources aboard a first and second shooting boats are sequentially fired as the boats traverse flanking zigzag course lines relative to a streamer containing a series of hydrophones. After the locational traces are generated; these traces can be associated with cross sets of center points substantially normal to the base course line of the streamer and processed by a technique known as beam steering to produce a series of cross directional traces. Each cross directional trace has an enhanced (increased) signal-to-noise ratio.

In the second mentioned application, locational traces related to a grid of two-dimensional center points, are obtained using a single boat for recording and shooting purposes. In more detail, a single streamer of hydrophones is arcuately positioned by having the trailing end of the streamer more offset relative to the base course line than the leading end. A source is energized in sequence in a vertical plane coincident with base course line. The subsequently generated locational traces can be recorded in a digital field recording format, and thus be compatible with general and special purpose digital computers for later processing of the seismic data. Positional annotation is also obtained by using a digital sonar ranging system in which sonar pulses from a transmitter aboard the boat are detected by a series of transducers along the streamer and retransmitted back to the boat.

Normally, in digital field recording, 12 binary bits are needed to define a number representing the amplitude of the analog seismic signal at a given point along the time base. These binary bits of information are then recorded on the data record section of the seismic magnetic tape in a time sequence related to the sampling rate. The resulting digital field tapes are then transmitted to a digital computing center for processing.

Among the mathematical and statistical processing techniques normally used on records at a computer center are a series of processes for enhancing the primary events within the trace records. For example, the field trace record can be processed to take into account differentials in time of arrival of the seismic energy. These differences are due to elevation and weathering variations. The resulting corrections are called static corrections. Also the records can be processed to take into account differences in arrival times of seismic energy due to variation in source-receiver distances along the reflection paths (normal moveout). Also, they can be processed to enhance dip moveout (i.e. differences in time due to the arrival of energy from a subterranean strata) vis-a-vis noise and/or primary events.

However, to provide a swathe of seismic data associated with the two-dimensional grid arrays as described and claimed in the above-identified applications, source-receiver distances are offset relative to a line of survey or base course line. Experience has shown that although later processing at a computer center of the resulting records occurs, seismologists are often unable to distinguish the variations in the traces due to cross dip moveout from normal movement of events contained therein. This is especially true if the traces are to be processed as sets of traces associated with center points perpendicular to the base course line of the survey. That is to say, since each locational trace is generated in the field in association with a given cross offset source-receiver pair, events contained in a subsequent set of cross traces can be a mixture of hoplelessly entangled normal and cross dip moveouts which can cause subsequent interpretation errors even though the records undergo further processing.

It is evident that where a swathe of data is collected and processed at a computer center that annotations of the true normal moveout of the data must occur. If the aforementioned annotation does not occur, later processing can provide erroneous results.

OBJECTS OF THE INVENTION

An object of the present invention is the provision of a continuously moving, novel marine seismic exploration system utilizing a single marine boat for operation and collection of seismic data associated with a swathe of uniform center points forming a two-dimensional grid array offset along the base course line of the boat in a manner such that the normal moveout and cross dip contributions of the cross sets of traces can be easily differentiated.

Another object of the present invention is the provision of a method and apparatus for encoding, on the header section of the seismic magnetic tape, a binary identification code which relates ultimately to the identification of relative and absolute hydrophone station and source point locations associated with a given shot as by using digitized seismic signals detected by a series of transducers aboard the marine streamers. The signals are then processed into the correct digital format for encoding onto tape.

SUMMARY OF THE INVENTION

In accordance with the present invention, a continuously moving marine seismic exploration system includes a repetitive seismic source and two separate streamers of hydrophones trailing behind a single seismic boat traversing the body of water along a straight base course line. The seismic source is fired at a selected repetition rate to generate a series of firing stations coincident with the base course line. The streamers include pluralities of hydrophones connected to the seismic boat by means of a bridle assembly extending from the rear of the boat; the bridle locates each streamer at different depths; each streamer terminates in a paravane assembly connected to its trailing end.

In operation, the paravane of a first streamer has a rudder assembly whose position is arranged, as by radio commands from the seismic boat or under mechanically induced programmed commands, to maintain the trailing end of the first streamer along a straight line parallel to the base line and offset from it by a selected but substantially constant distance much greater than that for the leading end of the streamer. Thus, because of forces acting thereon, the first streamer, assumes the shape of a modified catenary. On the other hand, the second streamer is arranged to trail behind the boat along a vertical plane substantially coincident with the base course line. Since the seismic boat proceeds along the base course line at a constant speed, a grid of depth points including a series of in-line seismic points are obtained. The outer boundary of points equal to one-half the offset distance of the trailing end of the first streamer from the base course line. When sets of traces associated with the offset and in-line seismic depth points are processed, the contribution of the normal and cross dip movement of each trace can be easily determined since the in-line traces are devoid of cross dip movement contributions. In order for the swathe of source-receiver positions at the surface to be clearly identified with the series of center point arrays, the streamers can also be provided with a series of sonic transducers along this length. Sonic pulses are emitted from a transmitter aboard the boat (preferably after seismic source is activated, but before the reflections are received at the hydrophones) and are subsequently detected by the streamer transducers and retransferred back to the boat. In that way, identifying the instantaneous locations of the transducers by means of digital ranging techniques can be achieved. In one form of the invention, the binary indications of the travel time of the sonic wave, and hence the instantaneous positions of the transducers per each slot, are directly encoded onto the field magnetic tape for later use in mapping of the subsurface under survey.

Other advantages and objects of the present invention will become more apparent from the following detailed description taken in conjunction with the following accompanying drawings in which:

PREFERRED EMBODIMENTS

Figure 1:
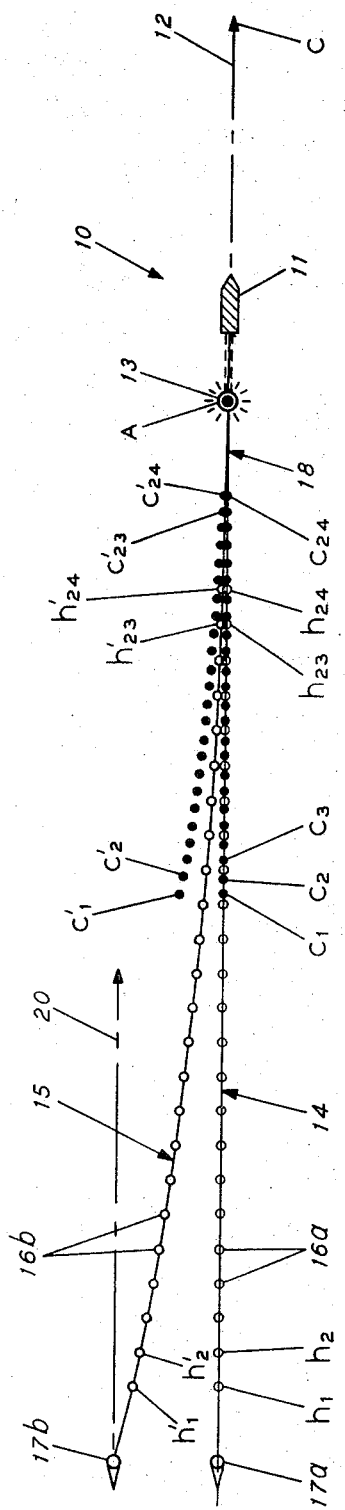
FIGS. 1 and 2 illustrate, in plain view, a chronologically related sequence of two instantaneous positions of first and second marine streamers and a repetitive seismic source operated from and in conjunction with circuitry aboard a single seismic boat; these Figures illustrating how a series of locational traces can be associated with individual center points aligned along a series of projections dictated by the instantaneous positions of the first marine streamer while the second streamer maintains relative instantaneous locations in a vertical plane coincident with the base course line.

Referring now to FIG. 1, a marine seismic exploration system 10 is shown at one point in time as single shooting and recording boat 11 traverses along a straight, base course line of traverse 12. Behind shooting and recording boat 11 are seismic source 13 and marine streamers 14 and 15. Each streamer includes a series of hydrophones (functionally indicated at 16a and 16b) and each terminates in a paravane assembly 17a and 17b. At these leading ends, the marine streamers are coupled to the boat 11 by means of bridle assembly 18, the assembly 18 being bifurcated to place the leading ends of the streamers 14 and 15 in a common vertical plane with base course line 12 but at different depths below the surface of the water.

During the collection process, the shooting and recording boat 11, seismic source 13 and first marine stream 14 travel a straight line, along course line 12. However, the travel of the marine streamer 15 is more complex. Its paravane assemble 17b is provided with a rudder assembly (not shown) which can be programmed to maintain the change position of the trailing end of the streamer along a pathway 20 parallel to but a fixed distance D from the course line 12. Its leading end, however, remains in vertical alignment coincident with that of streamer 14 along course line 12. Its more centrally located individual hydrophones 16b follow a family of parallel paths having different (and progressively smaller) offset distances with repect to the line 12.

Locations of the source 13 as activation occurs is at point A in FIG. 1. In FIG. 1, the paravane assemblies 17a and 17b are at their initial positions relative to the course line 12 as shown. When source 13 is activated, a series of center points $C_1$-$C_{24}$ are generatable in a vertical plane coincident with course line 12 in association with the instantaneous positions of the hydrophones 16a of streamer 14, such points being located at the midpoint between source point A and hydrophones 16a of the streamer 14. Similarly, in the cross-direction, activation of the source 13 at point A produces a second set of center points $C_1'$-$C_{24}'$ in association with the instantaneous positions of hydrophone 16b of streamer 15. Each center point $C_1'$-$C_{24}'$ is also preferably substantially alignable in the cross direction with center points $C_1$-$C_{24}$ simultaneously generated in conjunction with streamer 14. However, some deviation can occur since later processing techniques can normalize the variations.

The center points $C_1'$-$C_{24}'$ are seen to be not parallel to the center points $C_1$-$C_{24}$. Instead, they are located (at the midpoint between source point A and individual hydrophones 16b of the streamer 15) along an imaginary family of lines drawn between source point A and the instantaneous positions of respective hydrophone stations of the streamer, say in the form of a two- or three-dimensional catenary. The center of curvature of the center points $C_1'$-$C_{24}$ is offset with respect to both the streamers 14 and 15 so that the cross offset of the hydrophone positions forming respective hydrophone stations $h_1' \ldots h_{24}'$ of streamer 15 is not constant, i.e., the distance from the course line 12 to station $h_1'$ is larger than that from the line 12 to station $h_{24}'$. Accordingly, the cross offset of the center points $C_1'$-$C_{24}'$ from line 12 is also variable.

Figure 2:
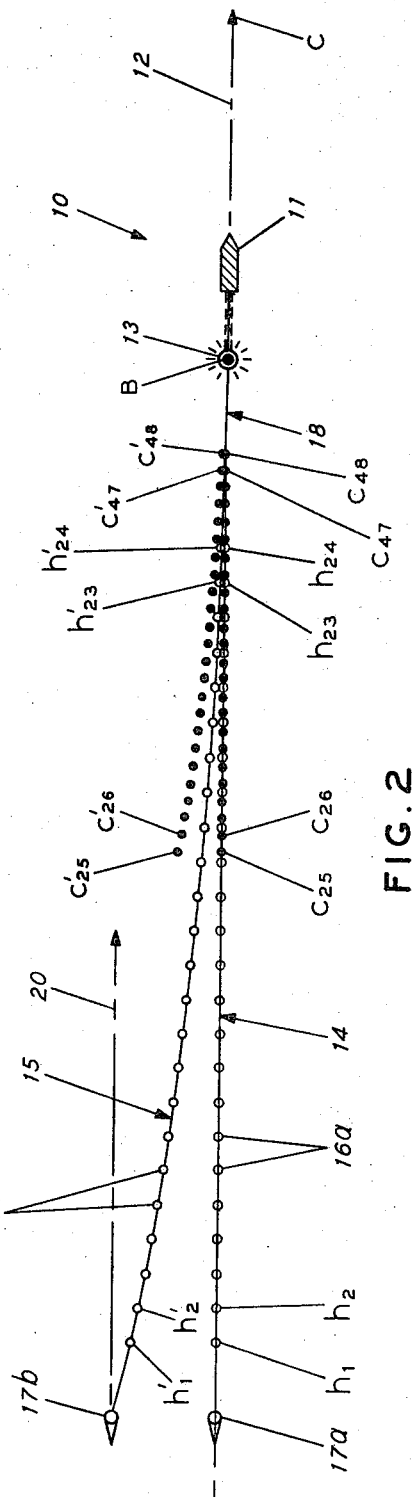

In FIG. 2, marine exploration system 10 is shown at another point in time along base line 12. As shown, the paravane assemblies 17a and 17b have moved from their initial position (FIG. 1) to a more forward location; note that during such movement, streamer 15 maintains its distance D with respect to line 12. As the seismic source 13 is activated, the instantaneous position of the seismic source generates a new source point B. At this instant, the instantaneous positions of the individual hydrophones generate a new array of center points associated with the instantaneous positions of the hydrophones comprising the streamers 14 and 15. The sequence is then repeated as the streamers and source assumes new positions in the direction of arrows C of FIGS. 1 and 2.

Figure 3:
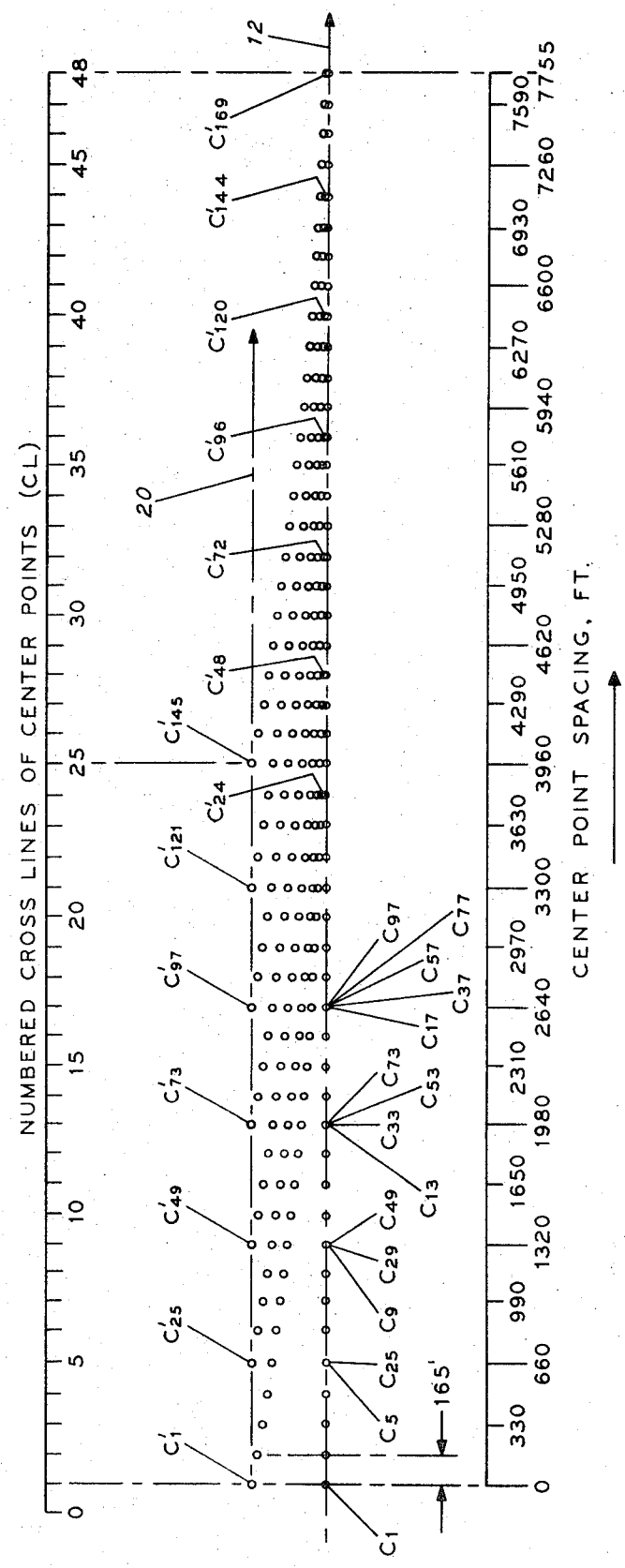
FIG. 3 is a plot of a two-dimensional grid of center points related to the instantaneous positions of the hydrophone and source array of FIGS. 1 and 2 and subsequent positions.

FIG. 3 illustrates a two-dimensional series of grids of center points generated during a surveying operation in which the source has been activated seven times, a seven-shot grid. Typical spacing of the center points resulting therefrom is indicated in feet across the bottom of the Figure. The offset spacing angle between the paravane assembly of streamer 15 and the course line 12 is indicated along the left-hand-side of the Figure as being about 13 degrees; the center points associated with streamer 14 are, as previously mentioned, in vertical alignment with the base course line 12.

In essence, there are two sets of center points generated in FIG. 3. A first set occurs due to the variation of instantaneous position of streamer 15 which generates center points whose boundary parallels line 12. Although the center points of this grid are aligned along imaginary lines perpendicular to base course line 12, the density of points can decrease away from this line. The second set is one-dimensional and occurs due to the instantaneous positions of streamer 14 as a function of distance along the base course line. Moreover, the sets of center points are also seen: (1) to overlap near the leading ends of streamers 14 and 15, and (2) to be in parallel cross alignment near the trailings end of the same streamers. When later processing occurs, location traces associated with aforementioned first and second sets of center points lend themselves to intrepretation, either manually or automatically, which distinguishes normal and cross dip movement characteristics of the composited records since traces associated with the second set of center points generated in conjunction with streamer 14 is essentially devoid of cross dip movement. That is to say, locational traces associated with the second set of in-line center points have essentially only in-line moveout components. Hence, normal and dip moveout (in-line) characteristics can be easily distinguished. And, even though locational traces associated with the first set of center points have (a) normal moveout, (b) in-line dip moveout and (c) cross dip moveout characteristics, interpretations performed on the second set of traces allows for the easy determination of (a), (b) and (c), supra.

During processing of locational traces, the importance of knowing the position of each center point of the grid is self-evident. Accordingly, the relative instantaneous positions of the hydrophones of the streamers relative to the seismic source must be accurately established during each period of shooting and collection of data cycle. That is, the relative position of absolute hydrophone stations $h_1$-$h_{24}$ and $h_1'$-$h_{24}'$ of FIG. 1 relative to source point A must be determined and indicated.

Figure 4:
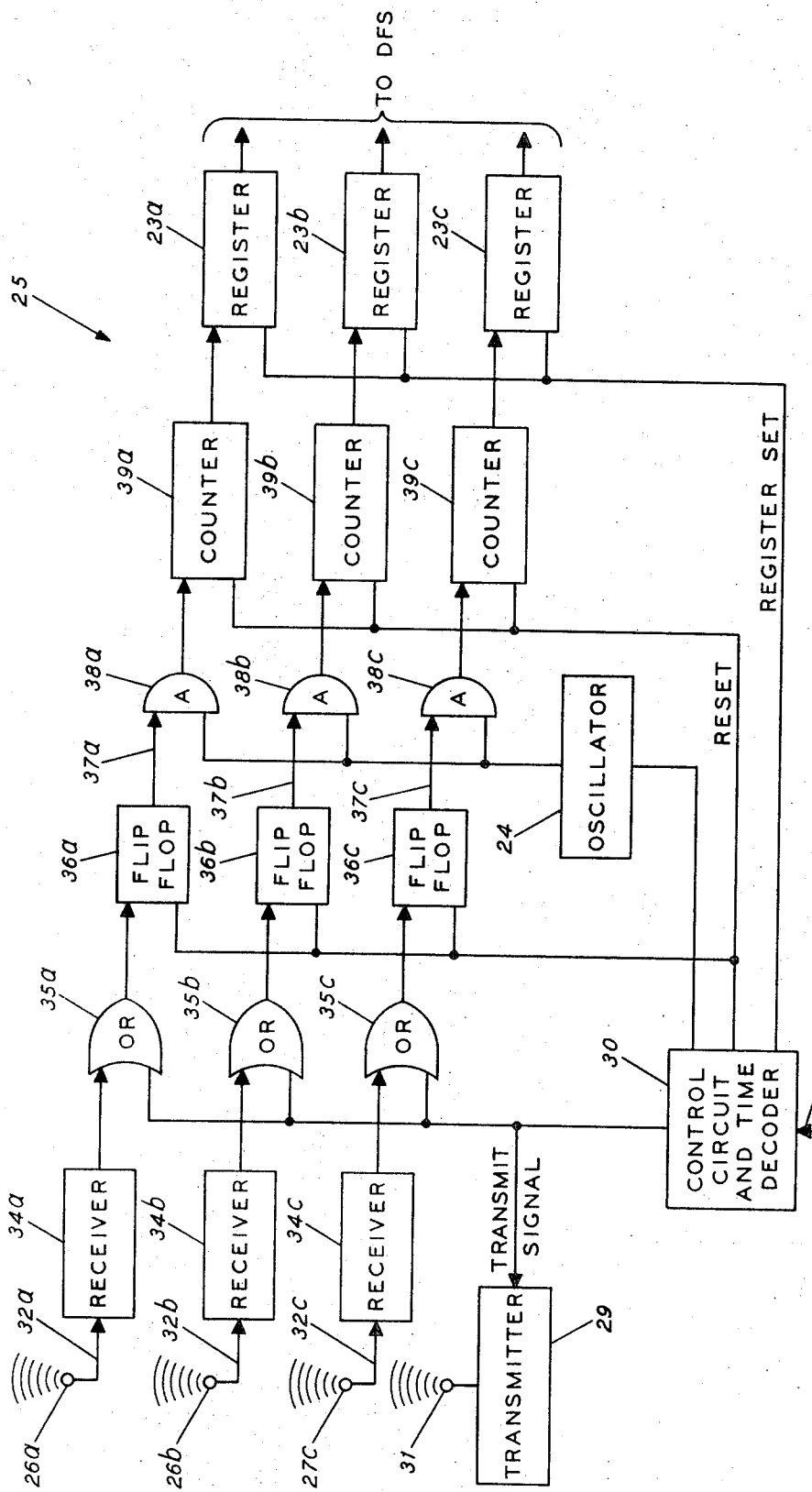
FIG. 4 is a schematic representation, in block form, of circuitry for generating digitized locational information related to the relative positions of the marine streamers during each shooting and collection period.

FIG. 4 is a system block diagram of digital sonar range indicating circuitry 25 for indication of relative positions of two sets of target transducers positioned along the marine streamers 14 and 15 during each shooting and collection period. Before describing circuitry 25 in detail, however, a brief discussion of digital field equipment useful in recording of field data in a digital format may be instructive, and will now be presented with specific reference to FIG. 5.

Figure 5:
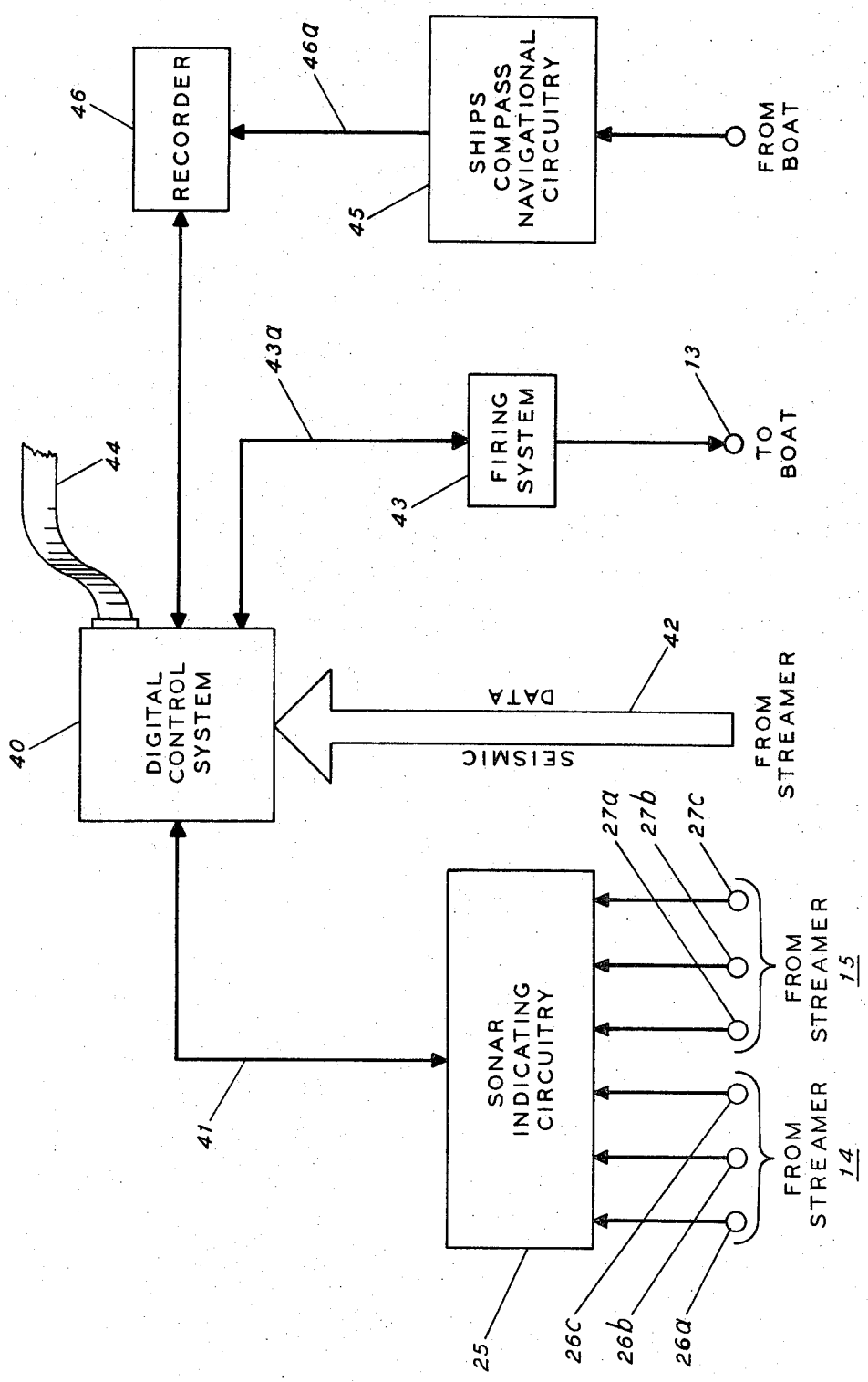
FIG. 5 is a diagrammatic representation of a digital sonic detecting and recording circuitry for collecting, recording and coding of seismic data including locational information related to the relative position of the marine streamers during each shooting and collection period in binary form, using the collection method of FIGS. 1, 2 and 3.

As shown in FIG. 5 the heart of the digital field collection systems of the present invention is digital field control system 40 which coordinates operations of all remaining circuitry. As shown, the remaining field circuitry includes: sonar range circuitry 25 interconnecting the two sets of target transducers 26a, 26b, 26c (associated with streamer 14) and 27a, 27b, and 27c (associated with streamer 15) with the digital field control system 40 through conductor means 41. Paralleling conductor means 41 and sonar range circuitry 25 is field conductor means 42 connecting the hydrophones of the streamers to the digital field control system 40. In order to synchronize data collection operations, the digital field control system 40 is also seen to connect via conducting means 43a through firing system 43 to a seismic source 13. All system information is recorded on a field magnetic tape 44 within system 40.

Although relative mapping of the streamer is established by sonar range indicating circuitry 25 (to be explained in detail below), there is also a need for determining the absolute geographic positions of the streamer. For this purpose, navigational circuitry 45 is seen in FIG. 5 to connect a through conducting means 46a to a separate digital recording means 46.

Timing logic for controlling the operation of the circuitry of FIG. 5 can be quite complex and a key to understanding the interrelated operations is by observing the digital format of the information recorded onto magnetic tape 44.

Primary requisite of the format of tape 44: it must be, of course, compatible with later processing by digital computer. Further, since the computer basically manipulates and processes data based on data character length divided into "words" and "blocks," the magnetic tape format of tape 44 must be likewise organized.

Figure 6:
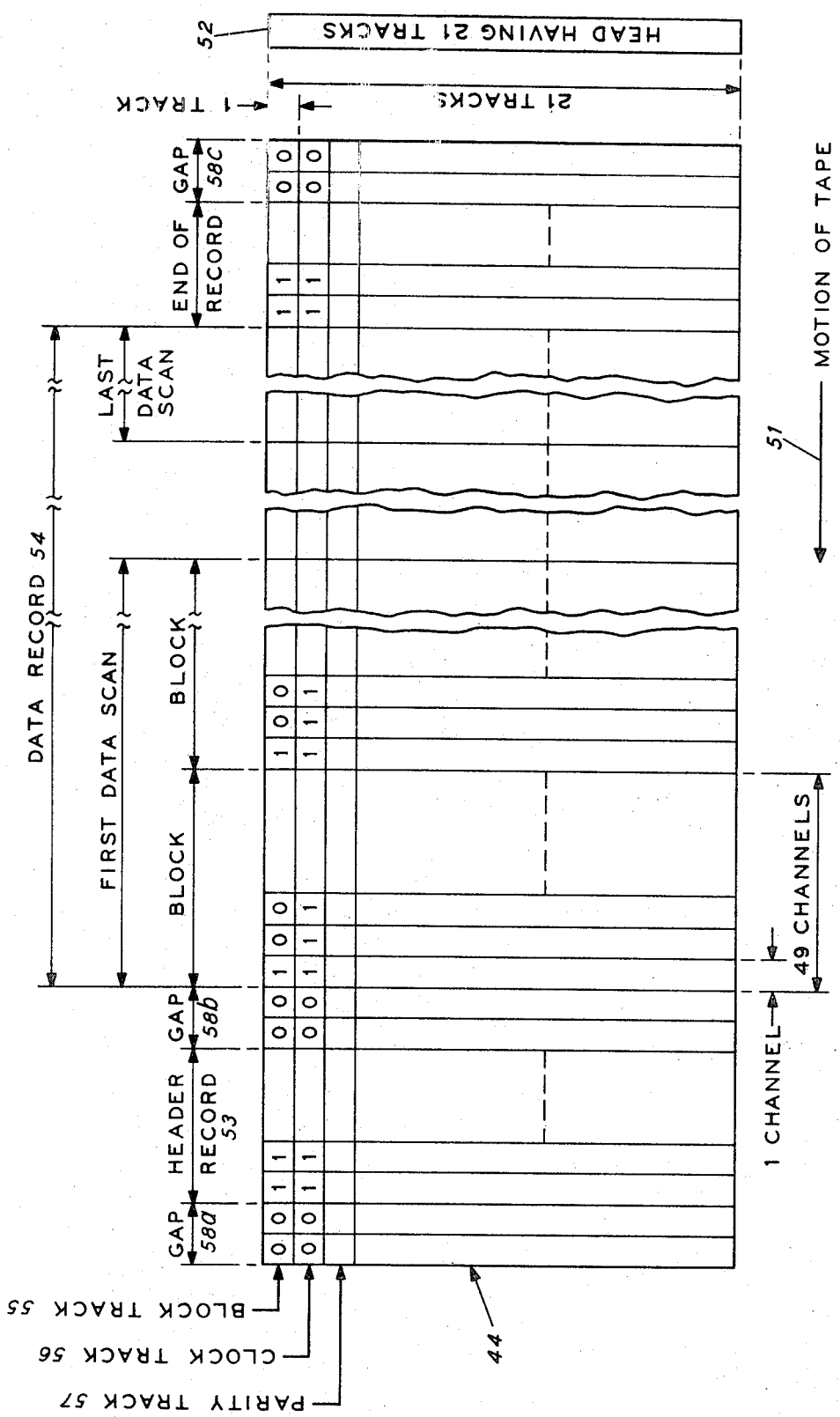
FIGS. 6 and 7 illustrate bit-word representation of the locational information onto magnetic tape in binary format as provided by the circuitry of FIG. 4

In FIG. 6, for example, a conventional magnetic tape format is seen to be arranged in a series of 21 tracks across the width of the tape 44 and in a plurality of channels along the length of the tape 44. Motion of the tape is in the direction of arrow 51. Transfer of data to the tape is accomplished by a 21-track head unit 52 positioned at the right-hand side of FIG. 6. Indications of specific sections of data along the longitudinal length of the tape divide each record in header section 53, and a data record section 54. Within the data record section 54, the data is further organized into a series of data section as indicated.

Along the width, the series of tracks include the following: 18 data tracks and 3 control tracks. The control tracks comprise block track 55, clock track 56 and parity track 57. Further, one of the data tracks, say, the O track, can be utilized, sequentially, for control purpose, viz, to indicate the sign ($\pm$) of the channel.

The block and clock tracks 55 and 56 are used to record block pulses and clock pulses, respectively. A block pulse is generated at the dividing point between each two data blocks and thus distinguishes the data blocks which follow. The block pulses are recorded by continuously magnetizing the block track 55 in one direction by means of the head unit 52. To establish the ONE state, the block track 55 is magnetized continuously at the start of the record, the end of the record, and for each block address word. Where data words are inserted into the record after the block address, no pulses are recorded within the block track 55 (ZERO state).

A clock pulse is generated at clock track 56 at each channel for all data words. Where a gap appears in the record, say, at gaps 58a, 58b, 58c, the data bits on block track 55 and clock track 56 are in the ZERO state. At the start of each block of data, except for the zero block address (remaining channel tracks are in the ZERO state), the address is signified by means of $2^0$ to $2^N$ orders of binary bits which can appear in the 18 data channels.

The parity track 57 is used to record a parity pulse which serves as a check of the efficiency of the transfer of the seismic data to the magnetic tape. All information within one data channel should add up to either an odd or even number which can be checked with the parity signal provided within each parity track 57. For example, for the data tracks 1, 2 . . . 18, a parity pulse ONE will appear if these data tracks contain an even number of ONE's.

Gaps 58a, 58b and 58c have previously been indicated by means of ZERO states at the block and clock tracks 55 and 56 for all channels comprising the gap. Gap 58b is seen to be positioned between header record section 53 and data record section 54. After data has been transferred to the header record section, head unit 52 can be positioned at gap 58b to await reception of seismic signals at the hydrophones. When the tape is motionless, the head 52 preferably rests over the middle of the gap. One half of the length of the gap is usually required to accelerate the tape motion up to full recording speed.

Within the data record section 54, each channel is divided into one 18-bit word and 3 control bits, as previously mentioned. The number of blocks required to provide a seismic data record varies with the amount of fixed information which is provided to the head unit 52. For example, a 6-second analog signal received at the hydrophone spread of FIG. 1 and sampled at .002-second intervals, digitized and then recorded, will have $6/.002 = 3,000$ blocks of data arranged along the logitudinal length of the magnetic tape.

Within each data scan, the first channel of each block is referred to as the block word. The block word, as previously mentioned, specifies the number of the block and identifies the channel as a block word in the form previously mentioned. The remaining number of channels in each block are referred to as data words and, in length, can vary in accordance with the number of hydrophones within the hydrophone spreads. The seismic data is located within each data channel in, say, the most significant 13-bit positions of each 18-bit word. The remaining bits of each data channel provide for recording of binary amplifier gain change indications (4 bits) as well as the sign indication (1 bit).

As will be explained in more detail below, binary gain amplifiers are used to amplify the signal provided each hydrophone. The intensity of these signals received at the streamers and amplified by the binary gain amplifiers varies over an extremely large dynamic range. To avoid overloading the binary gain amplifier, the gain must be varied in accordance with the amplitude of the received signal. The incremental gain of each amplifier is indicated by the binary amplifier gain change indications (4 bits) mentioned above.

Figure 7:
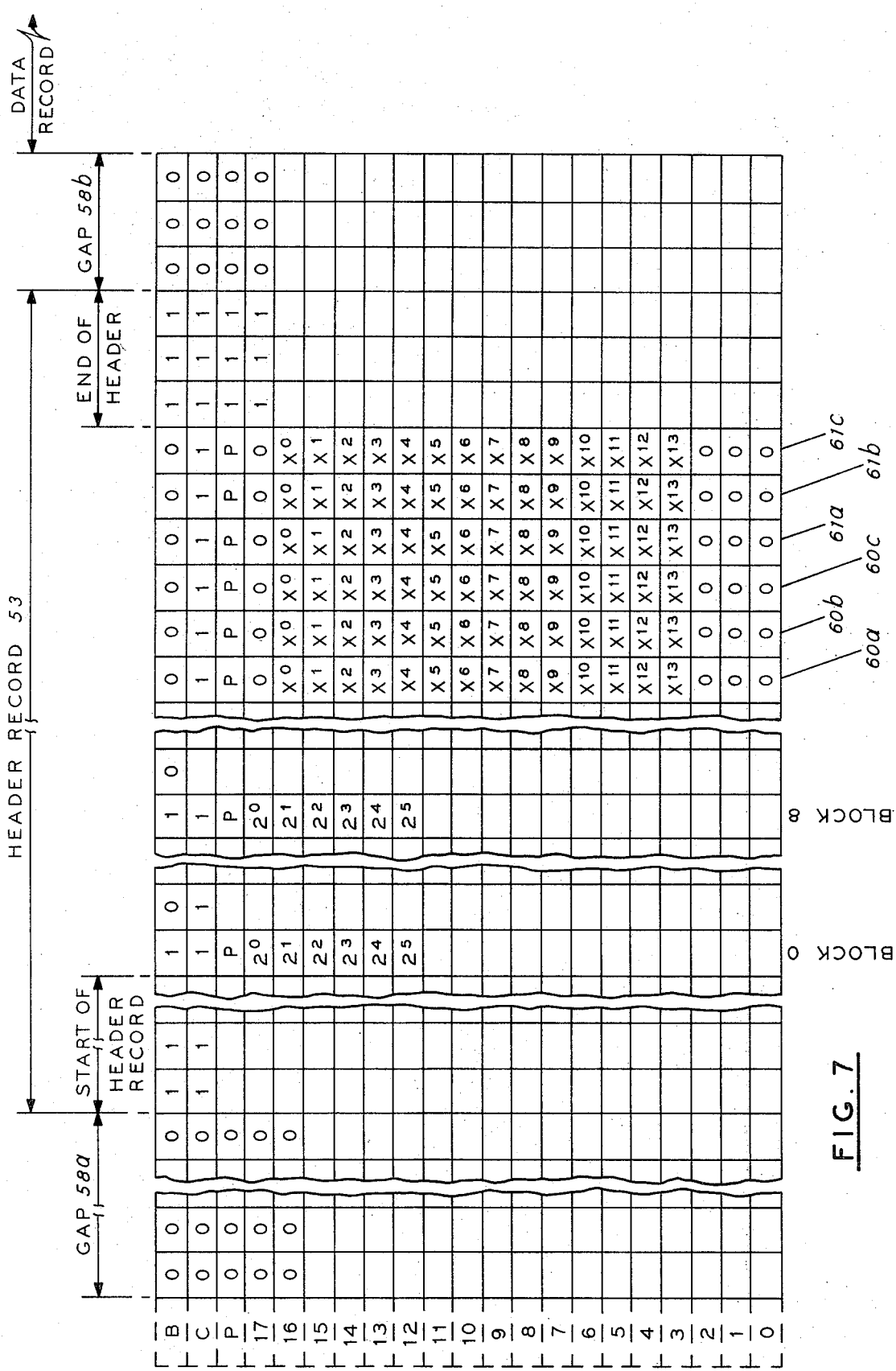

FIG. 7 depicts the header section 53 in more detail. Along the left-hand side, as viewed in FIG. 7, tracks 0 to 17 are illustrated related to the 18 data channels (with four blanks) while the control channels b, c and p relate to the block track, the clock track snd the parity track, respectively. At the start of the header record, block track and clock track b and c are coded with a "ONE" stored as shown. Within the remaining data tracks, the sign number, reel number, geographic location can be inserted in alphanumeric form. Beginning at block address "O", various conventional instrument settings are applied to the tape, such as the amount of presuppression set into each binary gain amplifier (initial gain) as well as the constant gain factor of each amplifier. Since modern seismic collection techniques employ a greater number of individual binary amplifiers, the binary data identifying amplifier characteristics as well as filter charateristics can occupy a rather large block of data, say, from block O to block 8 of the header section 53. Following the eight blocks of amplifier information, in binary form, there are set aside several blocks of data to indicate the following data in binary from: serial number, instrument type, sampling rate, hydrophone spacing interval, record length, trip delay as well as a series of hydrophone position marking codes. At selected channels, say, identified with words 60a, 60b, 60c, and 61a, 61b, and 61c identifies—in binary form—the time of sonic wave travel to transducers 26a–26c and 27a–27c of each streamer 14 and 15 of FIG. 5 with respect to an origin point on the boat just prior to reception of the seismic energy. Each multibit digital code can be transposed as represented by a decimal number related to range. For example, bit characters of each code $X^0 \ldots X^{13}$ positioned on tracks 16 . . . 3 can represent several orders of ranging information. Whether or not all bit characters are utilized depends on the travel time required for encoding onto the magnetic tape. In marine practice, it is not unusual to have ultralong marine streamers. The travel time of the sonic wave can be represented by the quantity R/V where R is the range to a certain streamer transducer, and V is the velocity of sonic transmission equal to 5,000 feet/sec. Accordingly, assuming a maximum streamer range of 3 miles (15,840 feet), the maximum time of travel (to a trailing end of the streamer) would be about 3.17 secs. If the counting rate is, say, 5,000 counts/sec., then 15,840 counts would be generated during each ranging cycle. In a digital code utilizing at least 14-bit positions ($X^0 \ldots X^{13}$), a time duration function of up to 16,382 counts can be designated per each 18-bit digital word (with three blank bits). (If greater range is to be indicated or a higher counting rate utilized the three blank bits of each 18-bit word can be used as a gain function equal to a multiplier function of 2, 4 or 8. Otherwise. these three bits are blank). The remaining bit is utilized to indicate whether or not the code is to the right or left flank of the seismic boat as viewed in FIG. 1 — a ONE, say, for the left, and a ZERO for the right.

The invention is not limited to a 21-track format, however. A 9-track format could also be used without departing from the intended scope of the present invention. In a 9-trace format, 8 data tracks are utilized, number 0, 1, 2, 3, 4, 5, 6, and 7, and one parity track (p) is also utilized. Each value is contained, in each record channel, in one group of 8-bit characters called a byte. Accordingly, in a 9-track format, each range code, containing at least 14-bit characters, would require to be recorded as at least two separate bytes of information.

As an example of the output of the binary code related to travel time, consider the binary codes of a range of 16,381 feet for a transducer positioned, say, at the trailing end of the marine streamer 14 or 15; a midpositioned transducer at, say, 9,855 feet from the marine boat; and a leading edge transducer located at about 330 feet from the marine boat. The binary code provided at the bit characters on three adjacent channels of a 21-track tape would be as follows assuming a counting rate of 5,000 counts/sec. and a travel velocity of 5,000 ft./sec.:

|  | $X^0$ | $X^1$ | $X^2$ | $X^3$ | $X^4$ | $X^5$ | $X^6$ | $X^7$ | $X^8$ | $X^9$ | $X^{10}$ | $X^{11}$ | $X^{12}$ | $X^{13}$ |
|---|---|---|---|---|---|---|---|---|---|---|---|---|---|---|
| Binary | 0 | 1 | 1 | 1 | 1 | 1 | 1 | 1 | 1 | 1 | 1 | 1 | 1 | 1 |
| Decimal |  |  |  |  |  |  | 16,381 (counts) |  |  |  |  |  |  |  |
| Binary | 0 | 0 | 0 | 1 | 1 | 0 | 0 | 1 | 0 | 1 | 0 | 0 | 0 | 1 |
| Decimal |  |  |  |  |  |  | 9,855 (counts) |  |  |  |  |  |  |  |
| Binary | 0 | 1 | 0 | 1 | 0 | 0 | 1 | 0 | 1 | 0 | 0 | 0 | 0 | 0 |
| Decimal |  |  |  |  |  |  | 330 (counts) |  |  |  |  |  |  |  |

The most significant bit of the code is, of course, the $X^0$ bit.

Since each streamer 14 and 15 is assumed to be at a constant (but possibly different) depth, the travel time indication to each transducer aboard each streamer establishes the relative locations of the hydrophones in the following manner: for the calculations related to streamer 15, the travel time binary code is converted at the computer center into slant range indications for each collection period. Since the streamer 15 is at a common depth and all hydrophone positions relative to the transducer positions are known, the relative locations of all hydrophones can be thus established. Similar techniques at the center can be used to establish the in-line range indications for streamer 14 during each collection period. Geodetic positions of the streamer transducers and then the hydrophones can likewise be easily generated at the computer center. But since the hydrophone geodetic positions are derived from the geodetic positions of the transducer, a description of how the coordinates of the former are generated may be instructive.

At the computer center, the binary multiword range indications with respect to the seismic boat, as provided by navigation circuitry 45 of FIG. 5, is utilized to transform the coordinates established for the boat to indicate hydrophone position.

As to the transformation process, reference is made hereinafter to the following example.
Given:
Ranges $R_1$, $R_2$ and $R_3$;
Depth of the streamer D and $X_a$, $Y_a$, $Z_a$
where $X_a$, $Y_a$, $Z_a$ are the three-dimensional coordinates of the transmitting transducer of the digital sonar ranging circuitry 25 of FIG. 7 during a selected collection period.

Calculate: The individual target coordinates $X_1$, $Y_1$, $Z_1$; $X_2$, $Y_2$, $Z_2$; $X_3$, $Y_3$, $Z_3$ of the transducers of the marine streamer to be computed using the following equations:

$$R_1 = \sqrt{(X_1 - X_a)^2 + (Y_1 - Y_a)^2 + (Z_1 - Z_a)^2}$$

$$R_2 = \sqrt{(X_2 - X_a)^2 + (Y_2 - Y_a)^2 + (Z_2 - Z_a)^2}$$

$$R_3 = \sqrt{(X_3 - X_a)^2 + (Y_3 - Y_a)^2 + (Z_3 - Z_a)^2}$$

Assuming a datum plane at the surface of the body of water, then the three-dimensional coordinates at the datum plane, namely, $X_{d_1}, Y_{d_1}, Z_{d_1}; X_{d_2}, Y_{d_2}, Z_{d_2}$; and $X_{d_3}, Y_{d_3}, Z_{d_3}$ for the transducers can be calculated using the following equations:

$$\sqrt{R_1^2 - D^2} = \sqrt{(X_{d_1} - X_a)^2 + (Y_{d_1} - Y_a)^2 + (Z_{d_1} - Z_a)^2}$$

$$\sqrt{R_2^2 - D^2} = \sqrt{(X_{d_2} - X_a)^2 + (Y_{d_2} - Y_a)^2 + (Z_{d_2} - Z_a)^2}$$

$$\sqrt{R_3^2 - D^2} = \sqrt{(X_{d_3} - X_a)^2 + (Y_{d_3} - Y_a)^2 + (Z_{d_3} - Z_a)^2}$$

where $R_1$, $R_2$ and $R_3$ are the ranges separating the transmitting and receiving transducers, D is the depth of the streamer and $X_{d_1}$, $Y_{d_1}$, $Z_{d_1}$; $X_{d_2}$, $Y_{d_2}$, $Z_{d_2}$; and $X_{d_3}$, $Y_{d_3}$, and $Z_{d_3}$ are the three-dimensional coordinates of the target transducers transformed to the datum plane.

It should be obvious that distribution (spacing) of the hydrophones could be varied so that the seismic information could be associated with positional locations defining a grid of center points of uniform density, as, for example described in the aforementioned patent applications assigned to the assignee of the present application.

Referring again to FIG. 4, the digital sonar ranging circuitry 25 for providing the aforementioned binary travel time codes for encoding onto magnetic tape will now be described in detail.

After the seismic disturbance has been initiated, time of travel determinations to transducers of streamers 14 and 15 (say where transducers 26a, 26b are typically the transducers associated with streamer 14 and transducer 27c is typical of the transducers aboard streamer 15) are carried out by the sonar ranging circuitry 25 in the following manner: transmitter 29 is energized by means of control circuit 30 to transmit a pulse of sonic energy to transmitting transducer 31 at, say, the rear of the boat and thence the energy travels through the water until detected by receiving transducers aboard streamer 14 and transducers aboard streamer 15, of which the above-identified transducers are typical. Transducers aboard the streamers are energized in the order of their location with respect to origin transducer 31. Assume that transducer 26a is located at the leading position of the hydrophones of the in-line streamer 14; that transducer 26b is located at the midposition of the streamer 14, while the transducer 27c is located near the trailing end of the slanted offset streamer 15 at a position most remote from origin transducer 31. Other transducers aboard the streamers (not shown) are correspondingly located. Accordingly, the near transducers like transducer 26a will be energized first, followed by the midposition transducers such as transducer 26b. Last, the trailing transducers like transducer 27c, are actuated. These signals are passed by way of typical conductors 32a, 32b and 32c through the marine streamer to the seismic boat. Since the near transducer 26a at the leading edge of the streamer receives the pulse first, receiver 34a will be actuated first; receiver 34b will be actuated next, followed last by receiver 34c. Return signals detected by the receivers 34a, 34b, and 34c pass through OR gates 35a, 35b and 35c to flip-flops (bistable multivibrators) 36a, 36b, and 36c. These flip-flops are of the type where successive pulses reverse the flip-flops between stable states of operation corresponding to "on" and "off" period modes of operation. Leads 37a, 37b, and 37c of the flip-flops 36a, 36b, and 36c constitute the output which will deliver an output signal when the flip-flop is in an "on" condition. Connected to the output leads 37a, 37b, and 37c are AND gates 38a, 38b, and 38c which are responsive to an enabling signal which is provided by control circuit 30 for passing the signals provided by the flip-flops to counters 39a, 39b, and 39c.

In order that the counters' readings be indicative of the travel time of a sonic wave from the transmitting transducers to the streamer transducers, clock oscillator 24 is operational to provide timing and counting pulses in addition to providing pulses to the counters 39a, 39b, and 39c through the AND gates 38a, 38b, and 38c as shown.

In the sequence of operations, a reset signal from the signal control circuit 30 is first utilized to set the counters 39a, 39b, and 39c to zero as well as to reset flip-flops 36a, 36b, and 36c so that a zero output signal to the AND gates 38a, 38b, and 38c is provided. At this time, the AND gates are closed, and counters 39a, 39b, and 39c do not receive the counting pulses from oscillator 24. However, when a transmitting signal from the signal control circuit 30 triggers transmitter 29, each of the flip-flops 36a, 36b, and 36c is triggered through OR gates 35a, 35b, and 35c permitting a high enabling signal to AND gates 38a, 38b, and 38c. Resulting counting pulses are accumulated by counters 39a, 39b, and 39c. After the transmitted sonic signal (from transducer 31) is received by the transducers 26a, 26b, and 27c aboard the streamers, these signals pass via the conductors 32a, 32b, and 32c back to the boat, specifically to receivers 34a, 34b, and 34c and thence through OR gates 35a, 35b, and 35c to flip-flops 36a, 36b, and 36c. As the signals are received at OR gates 35a, 35b, and 35c, the respective flip-flop is turned "off." Since the flip-flop is turned off, the associated AND gate is blocked, and the associated counters 39a, 39b, and 39c stops counting. Connected to each counter is a register 23a, 23b, and 23c which receives the count from each counter upon the occurence of a register set signal from control circuit 30. Such register holds the count until reset through an enabling signal from control circuit 30. In this regard, control circuit 30 includes a series of input channels generally indicated at 65 connected to the digital field control system 40 of FIG. 5. Logic signals pass from the control system 40 through input channels 65 in a predetermined enabling sequence so that binary indications of travel time can be transferred from the registers 23a, 23b, and 23c in proper sequence. Logic circuitry for generating enabling signals to provide for such logic transfers as well as for digital recording of all binary information is depicted with reference to FIG. 8, and will now be described in detail.

Figure 8:
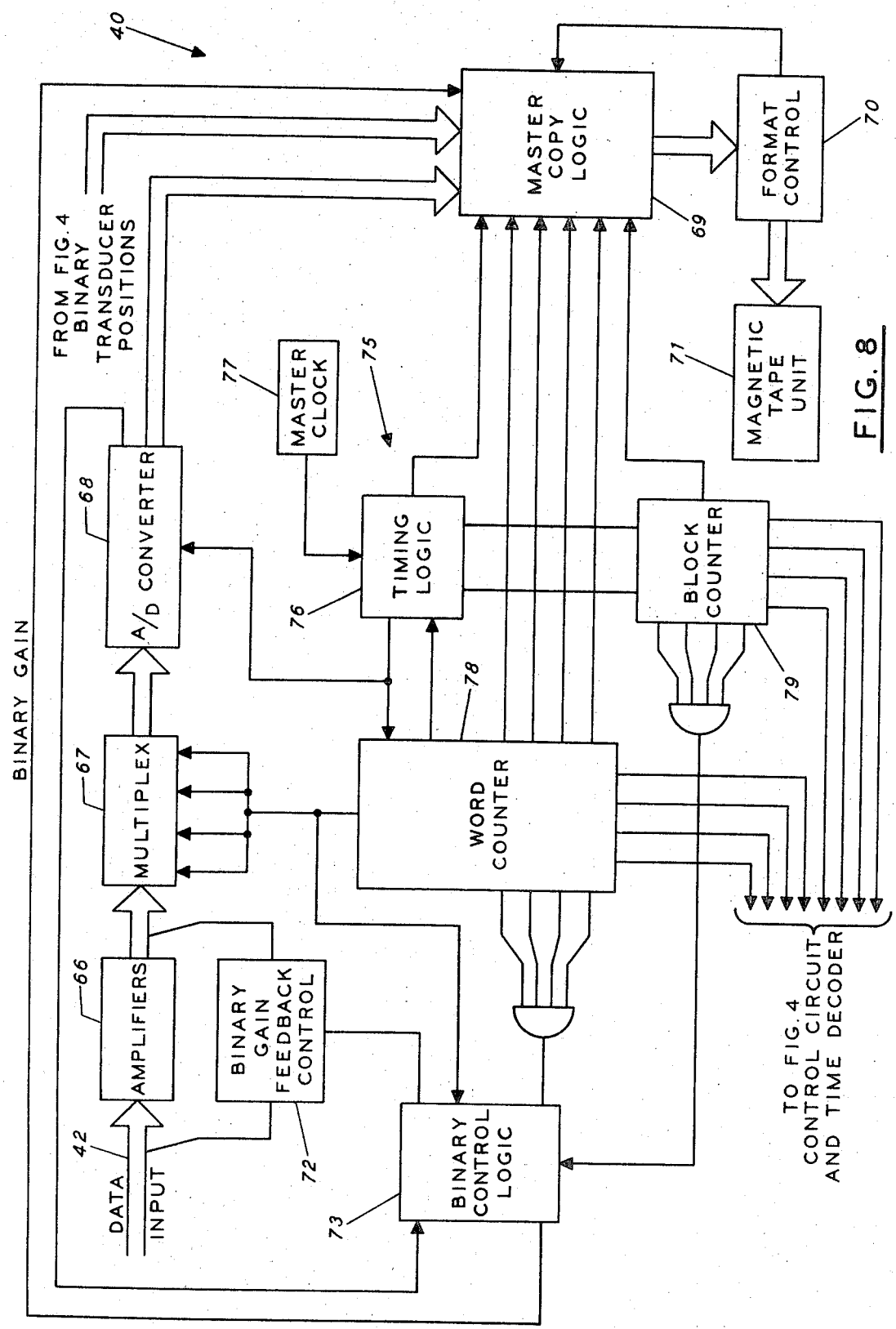
FIG. 8 illustrates, in functional block form, the digital seismic field system of FIG. 4 for controlling the collection method of FIGS. 1, 2 and 3.

As shown in FIG. 8, during collection of seismic data signals generated by the hydrophones pass from the streamer to digital field system 40 aboard the boat via conductor means 42, thence through amplifiers 66, multiplexer 67, analog-to-digital converter 68, master copy logic circuit 69, format control circuit 70 to magnetic tape unit 71 and onto magnetic tape. Binary gain shifts of amplifiers 66 are indicated by binary gain feedback control circuit 72 through binary logic circuit 73 connected between the feedback control circuit 72 and the master copy logic circuit 69.

To provide word lengths and block lengths of seismic data that are compatible with computer processing techniques, logic circuits 69 and 73 are carefully controlled for correct sequential operation utilizing a timing circuit generally indicated at 75. As indicated, timing circuit 75 includes a timing logic circuit 76 controlled by a master clock 77 and produces a series of timing (clock) pulses which are applied to logic circuits 69 and 73 through word counter 78 and block counter 79. The word and block counters 78 and 79 dictate, in conjunction with timing circuit 75, when the other groups of circuit elements must perform a preselected function. All operations are preferably performed in synchronism with the clock pulses (synchronous control). Each operation requires a certain number of clock pulses and, consequently, the timing to complete any one of the various operations is an exact multiple of the clock pulse. Thus, the readout of copy logic circuit 69 to magnetic tape unit 71 is accomplished at specific intervals of time that are exact multiples of the clock pulses. Further, the master copy logic circuit 69 can also be used to actuate other circuits, or other circuits can be used to terminate simultaneously with its actuation.

Header Information Encoding on Magnetic Tape at Magnetic Tape Unit 71

Initial binary gain settings are gated through master copy logic circuit 69, in correct time sequence, to permit digital recording onto the tape header section at magnetic tape unit 71. Timing logic circuit 75 in conjunction with word counter 78 and block counter 79 also provide enabling signals to a channel generally indicated at 65 of FIG. 4 which correctly enables control circuit 30 of FIG. 4. As a result, binary range position data — a six-word, 14-bit binary code — is passed through master logic circuit 69 and thence to magnetic tape unit 71 through format control circuit 70. Format control unit 70 may be provided with manual indexing circuitry in order to provide suitable binary information to the master copy logic circuit 69 during recording of header information. Although all header encoding activity is paced by signals from master timing logic circuit 75, during the header encoding activity, it is preferable that the amplifiers, multiplexer, and analog-to-digital converter remain in an inactive state. Usually master clock 77 is interrupted after header information has been placed onto magnetic tape at tape unit 71. Consequently, a gap is provided in the formatting of the tape record, in the manner previously discussed.

Seismic Data Encoding

After header information has been enclosed, processing steps are carried out in sequence to record in digital form the seismic data onto magnetic tape from the hydrophones aboard streamers 14 and 15. In more detail, at amplifier 66, the amplitude of the data from first streamer and then the other is determined using binary gain feedback control circuit 72. The binary gain of feedback control 72 is then gated through binary control logic circuit 73 to master copy logic circuit 69, in correct time sequence to permit its digital recording in the same channel as the binary seismic data. At multiplexer 67, the amplitude of each analog signal is electrically sampled in sequence over a plurality of very small time intervals — say, .002-second intervals. These signals, after being sampled, are transferred to analog-to-digital converter 68 where the digital results of the multiplexing operation are represented by a series of multibit binary code indications. The binary code information is electrically suited for storage on magnetic tape on the same channel as associated binary gain information. During all these steps, all activity is paced by regularly occurring clock signals from master clock 77. No event occurs within the entire system except at the occurrence of one of these clock signals or its multiple. In addition to block and word clock pulses, internal timing pulses are generated to cause transfer and manipulation of header and seismic data information such as at timing logic circuit 76 and master copy logic circuit 69. Thus, the output of copy logic circuit 69, for example, is accomplished at specific intervals of time which are exact multiples of the clock pulses produced by master clock 77. Other operations are caused to terminate simultaneously with the actuation of master copy logic circuit 69, while certain other circuits are being turned to a new state, signifying expiration of time for a preconceived, specified operation. As one subset of circuits is disabled, a new subset is enabled by timing pulses so as to perform new operational functions. The process (enabling some circuits, disabling others, in sequence) is repeated over and over.

Format control unit 70 is capable of manual changes during the seismic data encoding activity. In that way the format of the seismic data can be varied to meet new application requirements.

Magnetic tape unit 71 may be one of several commercially available types and should have the capability of recording seismic data in binary form onto magnetic tape.

Although the system described in FIG. 8 controls multiplexing and conversion of analog seismic data to digital data as well as to provide data in correct time sequences, additional circuitry can be inserted and combined with the system hereinbefore described to provide additional data processing features, if desired.

The method of the present invention is preferably incorporated into digital seismic field systems and digital firing systems conventionally used in collecting marine data in digital form, such as provided by the Texas Instrument Company, Inc., Dallas, Texas. However, only portions of that system pertinent to the present invention have been discussed in detail; e.g., the portion of the system related to timing logic for incorporating analog data related to normal and cross dip moveout identification, and/or data associated with binary code identification of marker range positions onto the magnetic tape has been discussed in detail above. Coordination of operations between the digital firing system and the digital seismic field system can, of course, be achieved in many ways, as, for example, shown in U.S. Pat. No. 3,416,631 for "Digital Remote Firing System," John D. Patterson.

In establishing the true position of the streamer relative to true geodetic coordinates, information derived from navigational circuit 45 of FIG. 5 is used in the following manner.

Navigational circuit 45 includes components for accurately measuring time travel of a radio signal from a transmitter to a receiver, and can be classified into one of five general groups: hyperbolic, ranging, azimuthal, composite and satellite systems, with a subgeneric classification of each being pulsed (time difference), CW (phase comparison) and combined (time difference and phase comparison). In general, they can be distinguished by the type of lattice (network of positional lines) generated by the transmitters as positional fixes occur. Source: H. W. Bigelow, "Electronic Surveying: Accuracy of Electronic Positioning Systems," Int. Hydrographic Bur. Radio Aids to Maritime Nav. & Hydrographic Operational Reports 6 (Sept. 1965), pp. 77–112.

Although only certain embodiments of the present invention have been illustrated and described, the invention is not meant to be limited to these embodiments, but rather to the scope of the following claims.

I claim:

1. A seismic data collecting method for determining the three-dimensional configuration of an earth formation underlying a body of water by means of a continuously moving marine seismic exploration system including a repetitive seismic source means and pluralities of hydrophones arranged in a first and second separate marine streamers, comprising the steps of:
   a. moving, by single seismic boat means traversing a substantially straight base course line, said repetitive seismic source means and said first and second streamers,
   b. said first streamer being moved so that center points between all possible source point-hydrophone station pairs during movement of said seismic boat along said base course line form a two-dimensional grid of center points laterally off-set to one side of said base course line including cross sets of center points aligned substantially perpendicular to said base course line, the total offset length of said two-dimensional grid of center points in said cross direction remaining substantially constant during the surveying operation, said movement of said first streamer being further characterized by allowing the trailing end of said streamer to trail behind said seismic boat offset relative to said base line and the leading end of the first streamer to lead from a series of locations closer to said base line than said trailing end;
   c. said second streamer being simultaneously moved so that center points between all possible source point-hydrophone stations pairs form an in-line, one-dimensional line of center points lying substantially in a vertical plane intersecting said base course line, said movement of said second streamer being further characterized by said streamer being positioned in a vertical plane coincident with said base course line, each of said in-line center points being aligned in the cross direction with said grid of center points generated in association with said first marine streamer;
   d. firing said seismic source means in sequence at known times to initiate travel of said seismic energy downward toward seismic discontinuities within said earth formation;
   e. providing a multibit digital positional data indication of the position of at least one target aboard at least one of said streamer relative to said seismic boat means; and
   f. receiving at said pluralities of hydrophones after firing of said seismic source means, separate reflection signals representative of the energy received as the hydrophones are positioned at a plurality of known hydrophone stations so as to provide first and second sets of multibit seismic data indications, said first set of indications being associated with cross sets of information associated with cross sets of center points generated by source point-hydrophone pairs associated with said first marine streamer, said second set of indications being associated with said one-dimensional line of center points;
   g. cooperatively processing said first and second sets of indications so as to provide identification of normal moveout as well as in-line and cross components of dip moveout within said data.

2. The method of claim 1 in which step (e) is further characterized by the substeps of:
   i. generating a sonic wave for travel from a known geodetic position relative to said boat means;
   ii. detecting said wave at targets aboard both said first and second streamers;
   iii. digitally determining the travel time of said wave between targets aboard said first and second streamers so that accurate annotation of position and data associated with said first and second streamers can be achieved;

3. The method of claim 2 in which substep (iii) includes:
   i. initiating counting by counting means as said sonic wave is generated;
   ii. terminating counting when said wave is detected at said streamer targets;
   iii. storing said counts in a register;
   iv. generating a time-dependent enabling signal by means of word and block counters connected to said register so as to cause gating of said counts from said register;
   v. recording said counts as multibit positional digital data indications on a header section of said magnetic tape so as to identify the target positions aboard each streamer as seismic data is received.

4. The method of claim 3 with the additional steps of:
   i. processing said multibit positional digital indications to determine the range from said known geodetic position to said streamer targets of each streamer, and
   ii. transforming the three-dimensional coordinates of said known geodetic positions to establish three-dimensional coordinates of said targets for each first and second streamers so as to enable accurate annotations of data associated with respective source point-hydrophone pairs of each first and second streamers.

5. A seismic data collecting method for determining the three-dimensional configuration of an earth formation underlying a body of water by means of a continuously moving marine seismic exploration system including a repetitive seismic source means and pluralities of hydrophones arranged in separate first and second streamers, comprising the steps of:
   a. moving, by single seismic boat means traversing a substantially straight base course line, said repetitive seismic source means and said first and second streamers;
   b. said first streamer being moved so that center points between all possible source point-hydrophone station pairs during movement of said seismic boat along said base course line form a two-dimensional grid of center points laterally offset to one side of said base course line including cross sets of center points aligned substantially perpendicular to said base course line;
   c. said second streamer being simultaneously moved so that center points between all possible source point-hydrophone station pairs form an in-line, 1-dimensional line of center points lying substantially in a vertical plane intersecting said base course line, each of said in-line center points being associated in the cross direction with one of said cross sets of center points generated in association with said first marine streamer;

d. firing said seismic source means in sequence at known times to initiate travel of said seismic energy downward toward seismic discontinuities within said earth formation;

e. providing a multibit digital positional data indication of the position of at least a target aboard at least one of said streamers relative to said seismic boat means; and f. receiving at said plurality of hydrophones after firing of said seismic source means, separate reflection signals representative of the energy received as the hydrophones are positioned at a plurality of known hydrophone stations so as to provide first and second sets of multibit seismic data indications, said first set being associated with said cross sets of center points generated in association with said first marine streamer, said second set being associated with said one-dimensional in-line set of center points generated in association with said first marine streamer; and g. cooperatively processing said first and second sets of indications to distinguish normal moveout as well as in-line and cross components of dip movout within such data.

6. The method of claim 5 in which said multibit positional and seismic data indications are recorded onto seismic magnetic tape.

7. The method of claim 5 in which step (e) is further characterized by the substeps of:

i. generating a sonic wave for travel from a known geodetic position relative to said boat means;

ii. detecting said wave at targets aboard each first and second marine streamers; and iii. digitally determining the travel time of said wave between said known geodetic position and said boat means.

* * * * *

PO-1050
(5/69)

UNITED STATES PATENT OFFICE
CERTIFICATE OF CORRECTION

Patent No. 3,840,845          Dated October 8, 1974

Inventor(s) ROBERT J. S. BROWN

It is certified that error appears in the above-identified patent and that said Letters Patent are hereby corrected as shown below:

Col. 2 of ABSTRACT, line 31, "this" should read --their--;
"    "      , "    32, "after seismic" should read --after the seismic--.
" 1, line 50, "a constant grid" should read --a constant density grid--;
     line 56, "generated;" should read --generated,--.
" 2, line 51, "hoplessly" should read --hopelessly--.
" 3, line 37, the comma after "streamer" should be deleted;
     line 44, "points equal" should read --points is equal--;
     line 55, "this length" should read --their length--;
     lines 56-57, "after seismic" should read --after the seismic--;
     line 65, "per each slot" should read --per each shot--.
" 4, line 7, "plain view" should read --plan view--;
     line 58, "marine stream 14" should read --marine streamer 14--;
     line 62, "the change position" should read --the position--.
" 5, line 2, "with repect" should read --with respect--;
     line 4, "Locations" should read --Locations;--;
     line 31, the formula should read --$C_1'-C_{24}'$--
     lines 61-62, "line 12 is indicated ... 13 degrees" should read --line 12 is about 13 degrees--.
" 6, line 11, "location" should read --locational--;
     line 13, "intrepetation" should read --interpretation--.
" 7, line 2, "connect a through" should read --connect through;
     line 24, "record in header" should read --record into a header--;
     line 32, "purpose" should read --purposes--.
" 8, line 19, "logitudinal" should read --longitudinal--;
     line 47, "snd the" should read --and the--;
     line 60, "charateristics" should read --characteristics--.
" 9, line 1, "At selected" should read --Selected--;
     line 2, "60c and 61a," should read --60c, 61a,--;
     line 3, "61c identifies" should read --61c identify--;

PO-1050
(5/69)

UNITED STATES PATENT OFFICE
CERTIFICATE OF CORRECTION

Patent No. 3,840,845      Dated October 8, 1974

Inventor(s) ROBERT J. S. BROWN      Page - 2

It is certified that error appears in the above-identified patent and that said Letters Patent are hereby corrected as shown below:

Col. 9, line 31, "are blank.)" should read --are blank.--;
line 32, "whether or not the code is to" should read --whether or not the transducers are to--;
line 38, "9-trace" should read --9-track--;
in the table, after "Binary Decimal" first occurrence, the first 2 numbers should read --1  0-- not "0  1";
in the table, after "Binary Decimal" second occurrence, the numbers should read --1  1  1  1  1  1  0  0  1  1--.

" 10, line 23, "FIG. 5, is" should read --FIG. 5, are--;
line 33, "FIG. 7" should read --FIG. 5--;
line 49, "$Y_{d_3}(Z_{d_3}$" should read --$Y_{d_3}$, $Z_{d_3}$--.

" 12, line 27, "39b, and 39c" should read --39b, or 39c--.
" 13, line 38, "encloded" should read --encoded--.

In the Claims

Col. 16, line 14, "said sonic" should read --said acoustic--;
line 24, "said mag-" should read --a mag- --;
lines 30-31, "targets of each streamer" should read --targets of said streamers--';
line 34, "for each" should read --for said--;
line 61, "in-line, 1-" should read --in-line, one- --.

Signed and sealed this 1st day of July 1975.

(SEAL)
Attest:

RUTH C. MASON
Attesting Officer

C. MARSHALL DANN
Commissioner of Patents
and Trademarks